(12) United States Patent
Umakantha et al.

(10) Patent No.: US 12,327,331 B2
(45) Date of Patent: Jun. 10, 2025

(54) SYSTEM AND METHOD FOR AUGMENTING VISION TRANSFORMERS

(71) Applicant: Robert Bosch GmbH, Stuttgart (DE)

(72) Inventors: Akash Umakantha, Warren, MI (US); S. Alireza Golestaneh, Pittsburgh, PA (US); Joao Semedo, Pittsburgh, PA (US); Wan-Yi Lin, Wexford, PA (US)

(73) Assignee: Robert Bosch GmbH, Stuttgart (DE)

( * ) Notice: Subject to any disclaimer, the term of this patent is extended or adjusted under 35 U.S.C. 154(b) by 460 days.

(21) Appl. No.: 17/540,326

(22) Filed: Dec. 2, 2021

(65) Prior Publication Data

US 2023/0177662 A1 Jun. 8, 2023

(51) Int. Cl.
*G06N 3/08* (2023.01)
*G06N 20/20* (2019.01)
(Continued)

(52) U.S. Cl.
CPC .............. *G06T 5/50* (2013.01); *G06N 20/20* (2019.01); *G06V 10/774* (2022.01);
(Continued)

(58) Field of Classification Search
None
See application file for complete search history.

(56) References Cited

U.S. PATENT DOCUMENTS

| | | | |
|---|---|---|---|
| 2019/0325264 A1 | 10/2019 | Keserich et al. | |
| 2021/0374553 A1* | 12/2021 | Li | G06N 3/088 |

(Continued)

FOREIGN PATENT DOCUMENTS

| | | | |
|---|---|---|---|
| CN | 109840575 A | | 6/2019 |
| CN | 113962737 A | * | 1/2022 |

(Continued)

OTHER PUBLICATIONS

Xun Huang, & Belongie, S. (2017). Arbitrary Style Transfer in Real-Time with Adaptive Instance Normalization. 2017 IEEE International Conference on Computer Vision (ICCV), 1510-1519. https://doi.org/10.1109/ICCV.2017.167 (Year: 2017).*

(Continued)

*Primary Examiner* — Amandeep Saini
*Assistant Examiner* — Caroline Tabancay Duffy
(74) *Attorney, Agent, or Firm* — Kathy Takeguchi; Maginot, Moore & Beck LLP (57) ABSTRACT

A computer-implemented system and method include performing neural style transfer augmentations using at least a content image, a first style image, and a second style image. A first augmented image is generated based at least on content of the content image and a first style of the first style image. A second augmented image is generated based at least on the content of the content image and a second style of the second style image. The machine learning system is trained with training data that includes at least the content image, the first augmented image, and the second augmented image. A loss output is computed for the machine learning system. The loss output includes at least a consistency loss that accounts for a predicted label provided by the machine learning system with respect to each of the content image, the first augmented image, and the second augmented image.

20 Claims, 4 Drawing Sheets

(51) Int. Cl.
*G06T 5/50* (2006.01)
*G06T 11/00* (2006.01)
*G06V 10/774* (2022.01)
*G06V 10/776* (2022.01)

(52) U.S. Cl.
CPC .. *G06V 10/776* (2022.01); *G06T 2207/20081* (2013.01); *G06T 2207/20084* (2013.01); *G06T 2207/20132* (2013.01); *G06T 2207/20212* (2013.01)

(56) References Cited

U.S. PATENT DOCUMENTS

2022/0101112 A1* 3/2022 Brown ............... G10L 15/18
2022/0198691 A1* 6/2022 Chen ................. G06V 10/25

FOREIGN PATENT DOCUMENTS

| CN | 114066716 A * | 2/2022 |
|---|---|---|
| WO | 2019/025909 A1 | 2/2019 |
| WO | 2020/073758 A1 | 4/2020 |
| WO | 2020/134556 A1 | 7/2020 |

OTHER PUBLICATIONS

Dosovitskiy, A., Beyer, L., Kolesnikov, A., Weissenborn, D., Zhai, X., Unterthiner, T., Dehghani, M., Minderer, M., Heigold, G., Gelly, S., Uszkoreit, J.,& Houlsby, N. (2021). An Image is Worth 16x16 Words: Transformers for Image Recognition at Scale. arXiv.Org. https://doi.org/10.48550/arxiv.2010.119 (Year: 2021).*
Ma, Zhuoqi et al. "Semantic-Related Image Style Transfer with Dual-Consistency Loss." Neurocomputing (Amsterdam) 406 (2020): 135-149. Web. (Year: 2020).*
Hendrycks, Dan et al. "AugMix: A Simple Data Processing Method to Improve Robustness and Uncertainty." arXiv.org (2020): n. pag. Web. (Year: 2020).*
Hendrycks, D. et al. AugMix: A Simple Data Processing Method to Improve Robustness and Uncertainty. (n.d.). arXiv (Cornell University). https://doi.org/10.48550/arxiv.1912.02781 (Year: 2020).*
Wang, H. et al.Squared $\ell_2$ Norm as Consistency Loss for Leveraging Augmented Data to Learn Robust and Invariant Representations. (n.d.). arXiv (Cornell University). https://doi.org/10.48550/arxiv.2011.13052 (Year: 2020).*
Saeed, A. Consistency Training of Multi-exit Architectures for Sensor Data. (n.d.). arXiv (Cornell University). https://doi.org/10.48550/arxiv.2109.13192 (Year: 2021).*
Caron et al., "Emerging Properties in Self-Supervised Vision Transformers," arXiv:2104.14294v2 [cs.CV], May 24, 2021, pp. 1-21.
Chen et al., "A Simple Framework for Contrastive Learning of Visual Representations," arXiv.2002.05709v3 [cs.LG], Jul. 1, 2020, pp. 1-20.
Chen et al., "When Vision Transformers Outperform Resnets Without Pre-Training or Strong Data Augmentations," arXiv:2106.01548v2 [cs.CV], Oct. 11, 2021, pp. 1-19.
Cheng et al., "Remote Sensing Image Scene Classification: Benchmark and State of the Art", Proceedings of the IEEE, 105(10):1865-1883, Oct. 2017, arXiv 1703.00121, 17 pages.
Cubuk et al., "RandAugment: Practical automated data augmentation with a reduced search space," arXiv:1909.13719v2 [cs.CV], Nov. 14, 2019, pp. 1-13.
Deza et al., "Towards Metamerism via Foveated Style Transfer," Published as a conference paper at ICLR 2019, arXiv:1705.10041v3 [cs.CV] Dec. 28, 2018, pp. 1-21.
Deza et al., "Emergent Properties of Foveated Perceptual Systems," arXiv:2006.07991vd [cs.CV], Jun. 22, 2021, pp. 1-20.
Dosovitskiy et al., "An Image is Worth 16 x 16 Words: Transformers for Image Recognition at Scale," Published as a conference paper at ICLR 2021, arXiv:2010.11929v2 [cs.CV], Jun. 3, 2021, pp. 1-22.
Freeman et al., "Metamers of the ventral stream," Nature Neuroscience, 14(9), 1195-1201 (2011), https://www.nature.com/articles/nn.2889, pp. 1-12.
Geirhos et al., "ImageNet-Trained CNNs are biased towards texture; Increasing shape bias improves accuracy and robustness," Published as a conference paper at ICLR 2019, pp. 1-22.
Goodfellow et al., "Deep Learning," MIT Press, 2016, https://www.deeplearningbook.org/.
He et al., "Momentum Contrast for Unsupervised Visual Representation Learning," arXiv.1911.05722v3 [cs.CV], Mar. 23, 2020, pp. 1-12.
He et al., "Mask R-CNN," arXiv.1703.06870v3 [cs.CV] Jan. 24, 2018, pp. 1-12.
Hendrycks et al., "Benchmarking Neural Network Robustness to Common Corruptions and Peturbations," Published as a conference paper at ICLR 2019, arXiv:1903.12261v1 [cs.LG] Mar. 28, 2019, pp. 1-16.
Hendrycks et al., "AugMix: A Simple Data Processing Method to Improve Robustness and Uncertainty," arXiv:1912.02781v2 [stat.ML] Feb. 17, 2020, pp. 1-15.
Huang et al., "Arbitrary Style Transfer in Real-time with Adaptive Instance Normalization," arXiv:1703.06868v2 [cs.CV] Jul. 30, 2017, pp. 1-11.
Kolesnikov et al., "Big Transfer (BiT): General Visual Representation Learning," arXiv:1912.11370v3 [cs.CV] May 5, 2020, pp. 1-28.
Krizhevsky et al., "ImageNet Classification with Deep Convolutional Neural Networks," Advances in Neural Information Processing Systems, vol. 25, Curran Associates, Inc., 2012, 9 pages.
Naseer et al., "Intriguing Properties of Vision Transformers," 35th Conference on Neural Information Processing Systems (NeurIPS 2021), arXiv:2105.10497v3 [cs.CV], Nov. 25, 2021, pp. 1-22.
Parkhi et al., "Cats and Dogs," 2012 IEEE Conference on Computer Vision and Pattern Recognition, Jun. 2012, 8 pages.
Redmon et al., "You Only Look Once: Unified, Real-Time Object Detection," arXiv:1506.02640v5 [cs.CV], May 9, 2016, pp. 1-10.
Shao et al., "On the Adversarial Robustness of Vision Transformers," arXiv:2103.15670v2 [cs.CV], Oct. 14, 2021, pp. 1-18.
Steiner et al., "How to train your ViT? Data, Augmentation, and Regularization in Vision Transformers," arXiv:2106.10270v1 [cs.CV], Jun. 18, 2021, pp. 1-14.
Touvron et al., "Training data-efficient image transformers & distillation through attention," arXiv:2012.12877v2 [cs.CV], Jan. 15, 2021, pp. 1-22.
Tuli et al., "Are Convolutional Neural Networks or Transformers more like human vision?," arXiv:2105.07197v2 [cs.CV], Jul. 1, 2021, pp. 1-7.
Vaswani et al., "Attention Is All You Need," 31st Conference on Neural Information Processing Systems (NIPS 2017), Long Beach, CA, USA, arXiv:1706.03762v5 [cs.CL], Dec. 6, 2017, pp. 1-15.
Wightman. Pytorch image models. GitHub—https://github.com/rwightman/pytorch-image-models.
Xu et al., "Robust and Generalizable Visual Representation Learning Via Random Convolutions," Published as a conference paper at ICLR 2021, arXiv:2007.13003v3 [cs.CV], May 3, 2021, pp. 1-19.
Yamins et al., "Performance-optimized hierarchical models predict neural responses in higher visual cortex," PNAS, vol. 111, No. 23, Jun. 10, 2014, pp. 8619-8624.

* cited by examiner

$$Loss = CE\left(f\left(Aug1\right), true\ label\right)$$

REFERENCE EXAMPLE

FIG. 5

$$Loss\ Output = CE(f(x_{orig}), true\ label) + \lambda JSD\left(f(x_{orig}) \parallel f(x_{aug1}) \parallel f(x_{aug2})\right)$$

FIG. 6

SYSTEM AND METHOD FOR AUGMENTING VISION TRANSFORMERS

FIELD

This disclosure relates generally to machine learning systems, and more particularly to training machine learning systems with neural style transfer augmentations and consistency loss.

BACKGROUND

The Vision Transformer (ViT) has recently performed relatively well across a variety of computer vision tasks. In ViTs, only MLP layers operate locally and are translationally equivariant, while the self-attention layers operate globally. As such, ViTs are thought to have weaker inductive biases than traditional convolutional neural networks (CNNs) for image data. However, this feature makes ViTs more difficult to train than CNNs at least since ViTs tend to require more data, augmentations, and/or regularization than similarly-sized CNNs during training. The data augmentation strategies used for training ViTs have largely been inherited from training CNNs even though there are significant differences between the ViT architecture compared to the CNN architecture.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method includes obtaining a content image, a first style image, and a second style image. The method includes performing a first style transfer to transfer a first style from the first style image to the content image to generate a first stylized latent representation. The method includes performing a second style transfer to transfer a second style from the second style image to the content image to generate a second stylized latent representation. The method includes generating a first augmented image based on the first stylized latent representation. The method includes generating a second augmented image based on the second stylized latent representation. The method includes generating, via the machine learning system, a predicted label for each of the content image, the first augmented image, and the second augmented image. The method includes computing a loss output for the machine learning system. The loss output includes a consistency loss based at least on the predicted label of each of the content image, the first augmented image, and the second augmented image. The method includes updating at least one parameter of the machine learning system based on the loss output.

According to at least one aspect, a computer-implemented method includes obtaining a content image, a first style image, and a second style image. The method includes generating a first augmented image based on content of the content image and a first style of the first style image. The method includes generating a second augmented image based on the content of the content image and a second style of the second style image. The method includes generating, via the vision transformer, a predicted label for each of the content image, the first augmented image, and the second augmented image. The method includes computing a loss output for the vision transformer. The loss output includes a consistency loss based at least on the predicted label of each of the content image, the first augmented image, and the second augmented image. The method includes updating at least one parameter of the vision transformer based on the loss output.

According to at least one aspect, one or more non-transitory computer readable storage media has computer readable data including instructions stored thereon that when executed by one or more processors perform a method. The method includes generating a content image based on a first image, generating a first style image based on a second image, and generating a second style image based on a third image. The method includes generating, via a first machine learning system, a first augmented image based at least on content of the content image and a first style of the first style image. The method includes generating, via the first machine learning system, a second augmented image based at least on the content of the content image and a second style of the second style image. The method includes training a second machine learning system with training data that includes the content image, the first augmented image, and the second augmented image. The method includes computing a loss output for the second machine learning system. The loss output includes a consistency loss based at least on the content image, the first augmented image, and the second augmented image. The method includes updating at least one parameter of the machine learning system based on the loss output.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
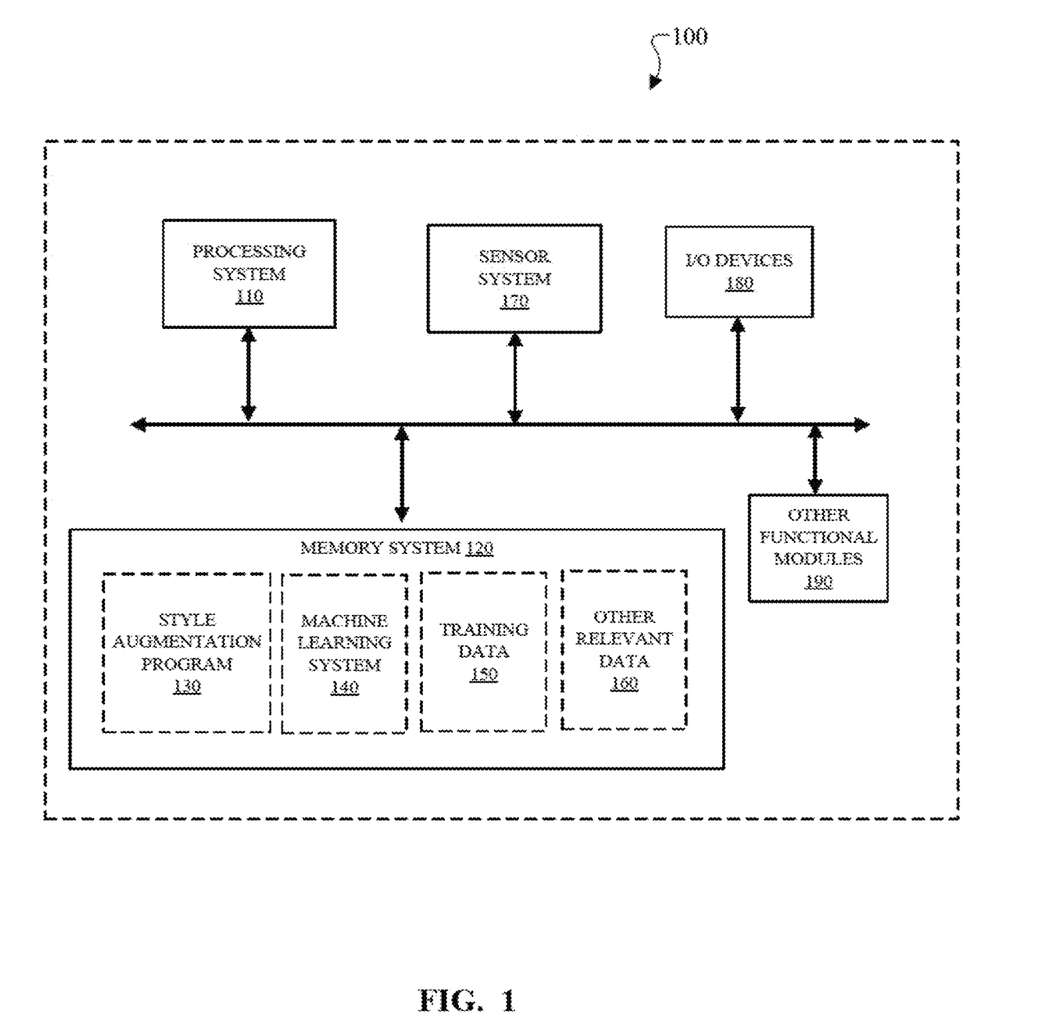
FIG. 1 is a diagram of an example of a system relating to augmenting a machine learning system according to an example embodiment of this disclosure.

FIG. 1 is a diagram of a non-limiting example of a system 100, which is configured to train, employ, and/or deploy at least one machine learning system 140, such as a vision transformer, according to an example embodiment of this disclosure. The system 100 includes at least a processing system 110 with at least one processing device. For example, the processing system 110 includes at least an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 110 is operable to provide the functionality as described herein.

The system 100 includes a memory system 120, which is operatively connected to the processing system 110. In an example embodiment, the memory system 120 includes at least one non-transitory computer readable storage medium, which is configured to store and provide access to various data to enable at least the processing system 110 to perform the operations and functionality, as disclosed herein. In an example embodiment, the memory system 120 comprises a single memory device or a plurality of memory devices. The memory system 120 can include electrical, electronic, magnetic, optical, semiconductor, electromagnetic, or any suitable storage technology that is operable with the system 100. For instance, in an example embodiment, the memory system 120 can include random access memory (RAM), read only memory (ROM), flash memory, a disk drive, a memory card, an optical storage device, a magnetic storage device, a memory module, any suitable type of memory device, or any number and combination thereof. With respect to the processing system 110 and/or other components of the system 100, the memory system 120 is local, remote, or a combination thereof (e.g., partly local and partly remote). For example, the memory system 120 can include at least a cloud-based storage system (e.g. cloud-based database system), which is remote from the processing system 110 and/or other components of the system 100.

The memory system 120 includes at least a style augmentation program 130, the machine learning system 140, training data 150, and other relevant data 160, which are stored thereon. The style augmentation program 130 includes computer readable data with instructions, which, when executed by the processing system 110, is configured to provide and implement a training process 200 with style transfer augmentation and consistency loss to at least one machine learning system 140. The computer readable data can include instructions, code, routines, various related data, any software technology, or any number and combination thereof. In an example embodiment, the machine learning system 140 includes a vision transformer, any suitable artificial neural network model, or any number and combination thereof. Also, the training data 150 includes a sufficient amount of sensor data, label data, dataset data (e.g., dataset 210 of FIG. 2), augmentation data (e.g., content image, first augmented image, second augmented image, etc.), various loss data, various weight data, and various parameter data, as well as any related machine learning data that enables the system 100 to provide the style augmentation training, as described herein. Meanwhile, the other relevant data 160 provides various data (e.g. operating system, etc.), which enables the system 100 to perform the functions as discussed herein.

The system 100 is configured to include at least one sensor system 170. The sensor system 170 includes one or more sensors. For example, the sensor system 170 includes an image sensor, a camera, a radar sensor, a light detection and ranging (LIDAR) sensor, a thermal sensor, an ultrasonic sensor, an infrared sensor, a motion sensor, an audio sensor, an inertial measurement unit (IMU), any suitable sensor, or any number and combination thereof. The sensor system 170 is operable to communicate with one or more other components (e.g., processing system 110 and memory system 120) of the system 100. For example, the sensor system 170 may provide sensor data, which is then used by the processing system 110 to generate image data based on the sensor data. In this regard, the processing system 110 is configured to obtain the sensor data directly or indirectly from one or more sensors of the sensor system 170. The sensor system 170 is local, remote, or a combination thereof (e.g., partly local and partly remote). Upon receiving the sensor data, the processing system 110 is configured to process this sensor data (e.g. image data) in connection with the style augmentation program 130, the machine learning system 140, the training data 150, or any number and combination thereof.

In addition, the system 100 may include at least one other component. For example, as shown in FIG. 1, the memory system 120 is also configured to store other relevant data 160, which relates to operation of the system 100 in relation to one or more components (e.g., sensor system 170, I/O devices 180, and other functional modules 190). In addition, the system 100 is configured to include one or more I/O devices 180 (e.g., display device, keyboard device, speaker device, etc.), which relate to the system 100. Also, the system 100 includes other functional modules 190, such as any appropriate hardware, software, or combination thereof that assist with or contribute to the functioning of the system 100. For example, the other functional modules 190 include communication technology that enables components of the system 100 to communicate with each other as described herein. In this regard, the system 100 is operable to at least train, employ, and/or deploy the machine learning system 140 (and/or the style augmentation program 130), as described herein.

Figure 2:
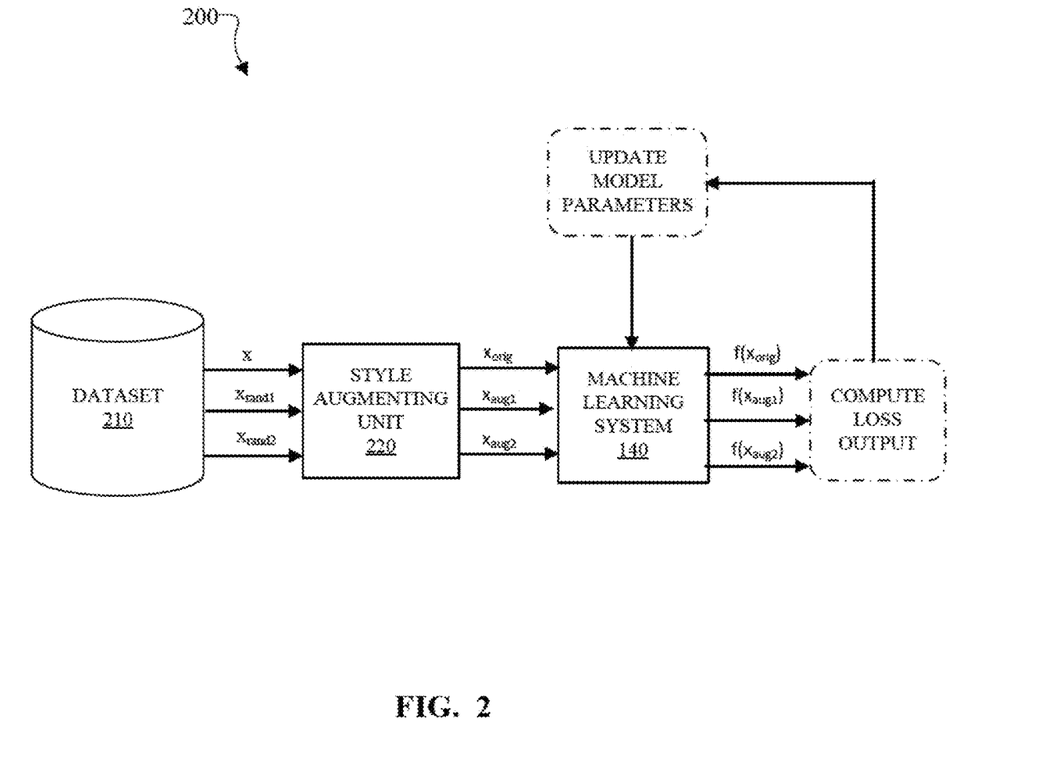
FIG. 2 is a diagram that illustrates a process for training a machine learning system according to an example embodiment of this disclosure.

FIG. 2 is a conceptual diagram that illustrates a training process 200 for at least one machine learning system 140 according to an example embodiment. In FIG. 2, the machine learning system 140 includes a vision transformer. Vision transformers are advantageous in being enabled to outperform state-of-the-art CNNs for certain tasks. For example, vision transformers have a number of advantages relative to CNNs, including: 1) increased adversarial and distribution-shift robustness, 2) ability to provide pixel-level segmentation using attention maps and 3) smaller texture bias and greater shape bias, thereby making vision transformers a good candidate model for human vision.

The training process 200 includes a data augmentation process that improves the performance of the machine learning system 140. In general, data augmentation can increase the size and quality of datasets, which can help prevent overfitting and greatly improve generalization of deep learning models. Since some machine learning systems 140 (e.g., vision transformers) have weaker inductive biases, they can be prone to overfitting, and thus benefit greatly from many strong augmentations.

The data augmentation process involves a style augmenting unit 220, which performs data augmentation based on a dataset 210 to generate an augmented dataset. As a non-limiting example, the dataset 210 includes ImageNet-21k, JFT-300M, any suitable data, or any number and combination thereof. The style augmenting unit 220 is configured to obtain at least a first image, a second image, and a third image from the dataset 210. The first image (x), the second image ($x_{rand1}$), and the third image ($x_{rand2}$) may be randomly selected from a batch or mini-batch of the dataset 210. In response to receiving the first image, the second image, and the third image as input, the style augmenting unit 220 is configured to generate at least a content image ($x_{orig}$), a first augmented image ($x_{aug1}$), and a second augmented image ($x_{aug2}$) as output. The content image, the first augmented image, and the second augmented image are different from the first image, the second image, and the third image, respectively. The style augmenting unit 220 generates the content image by processing the first image. The style augmenting unit 220 generates the first augmented image by processing the first image and the second image. The style augmenting unit 220 generates the second augmented image by processing the first image and the third image. The style augmenting unit 220 therefore augments the dataset 210 by providing the additional training data of the content image, the first augmented image, and the second augmented image. The training process 200 includes training the machine learning system with the augmented dataset and computing a loss output based on the augmented dataset. The training process 200 further includes updating one or more model parameters of the machine learning system based on the loss output.

Figure 3:
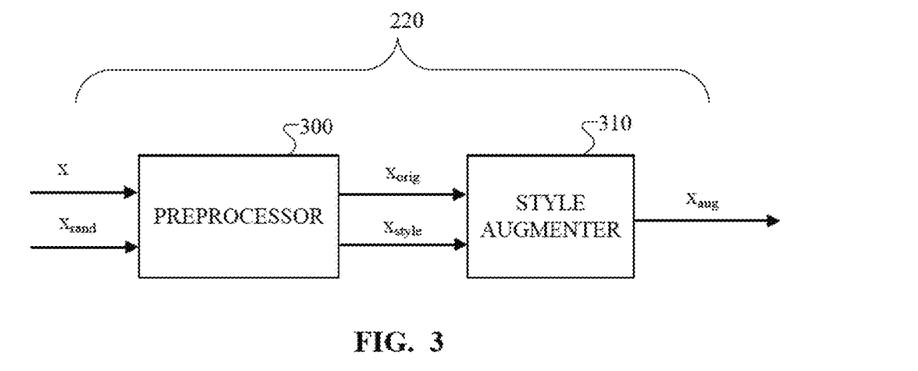
FIG. 3 is a diagram that illustrates a style augmenting unit according to an example embodiment of this disclosure.

FIG. 3 is a diagram relating to an example of the style augmenting unit 220 according to an example embodiment. In this example, the style augmenting unit 220 includes a preprocessor 300 and a style augmenter 310. Alternatively, the style augmenting unit 220 includes the style augmenter 310 without the preprocessor 300 such that the inputs (image x and a randomly selected image $x_{rand}$) are provided directly to the style augmenter 310 without being preprocessed beforehand. More specifically, referring to FIG. 3, as an example, the style augmenting unit 220 is configured to perform at least the operations, which are expressed in the following algorithm. In addition, the algorithm further includes the loss output, which is computed for the machine learning system 140 based on the data augmentation provided by the style augmenting unit 220.

| | Algorithm |
|---|---|
| Input | :Model f, classifcation loss $\mathcal{L}$, training image x and its class label y, two images sampled randomly from the current mini-batch $x_{rand1}$, $x_{rand2}$ |
| 1 | |
| 2 | Function StyleAug(x,$x_{style}$,α = 50,β = 50): |
| 3 |   z = $VGG_{enc}$(x)     // VGG encoder |
| 4 |   $z_{style}$ = $VGG_{enc}$($x_{style}$) |
| 5 |   $z_{adain}$ = AdaIn(z, $z_{style}$)     // adaptive instance normalization |
| 6 |   $x_{adain}$ = $VGG_{dec}$($z_{adain}$)     // VGG decoder |
| 7 |   m ~ Beta(α, β) |
| 8 |   $x_{aug}$ = m · x + (1 − m) · $x_{adain}$     // mix with original representation |
| 9 |   return $x_{aug}$ |
| 10 | |
| 11 | $x_{orig}$ = InceptionStylePreprocess(x)     // Random crop and horizontal flip |
| 12 | $x_{style1}$ = InceptionStylePreprocess($x_{rand1}$) |
| 13 | $x_{style2}$ = InceptionStylePreprocess($x_{rand2}$) |
| 14 | |
| 15 | $x_{aug1}$ = StyleAug($x_{orig}$, $x_{style1}$) |
| 16 | $x_{aug2}$ = StyleAug($x_{orig}$, $x_{style2}$)     // $x_{aug1}$ ≠ $x_{aug2}$ |
| 17 | |
| | Loss Output : $\mathcal{L}$ (f($\hat{y}$)$\|x_{orig}$), y) + JSD(f($\hat{y}$)$\|x_{orig}$) $\|$ f($\hat{y}$$\|x_{aug1}$) $\|$ f($\hat{y}$$\|x_{aug2}$)) |

As indicated by the algorithm, the preprocessor 300 is configured to perform inception-style preprocessing. For instance, in this example, the inception-style preprocessing includes at least 1) a resized crop with a randomly chosen scale (e.g., resized to 224×224), and 2) a random horizontal flip (e.g. p=0.5). In this regard, the preprocessor 300 is configured to crop at a relatively large cropping scale in this step to allow for testing of multi-scale cropping augmentations.

The preprocessor 300 is configured to generate a content image ($x_{orig}$) by performing inception-style preprocessing on the first image (x), such as a training image from the dataset 210. The preprocessor 300 is also configured to generate a first style image ($x_{style1}$) by performing inception-style preprocessing on the second image ($x_{rand1}$) from the dataset 210. The preprocessor 300 is configured to generate a second style image ($x_{style2}$) by performing inception-style preprocessing on the third image ($x_{rand2}$) from the dataset 210. The preprocessor 300 is configured to provide at least the content image, the first style image, and the second style image to the style augmenter 310.

Figure 4:
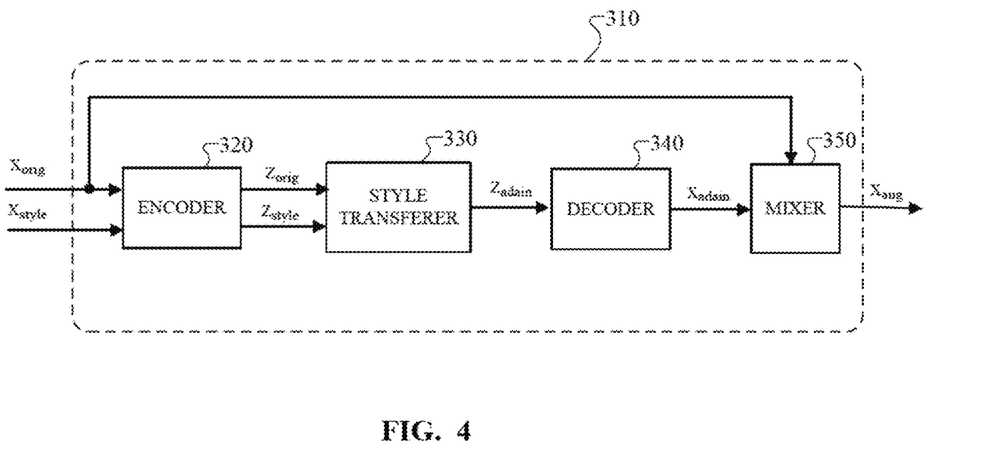
FIG. 4 is a diagram that illustrates a style augmenter according to an example embodiment of this disclosure.

FIG. 4 is a diagram of an example of the style augmenter 310 according to an example embodiment. The style augmenter 310 is configured to generate an augmented image ($x_{aug}$), based on a set of images. The set of images include at least two images. For example, in FIG. 4, the set of images include at least a designated content image ($x_{orig}$) and a designated style image ($x_{style}$). The content image is configured to provide the content of the augmented image while the style image is configured to provide the style of the augmented image. In the example shown in FIG. 3, the style augmenter 310 is configured to receive a designated content image and a designated style image as input from the preprocessor 300. The style augmenter 310 is configured to generate an augmented image in response to receiving the content image and the style image as input. The augmented image includes content of the content image that is stylized according to the style of the style image.

In FIG. 4, the style augmenter 310 includes a machine learning system. More specifically, the style augmenter 310 includes an encoder 320, a style transferer 330, a decoder 340, and a mixer 350. The encoder 320 is a (Visual Geometry Group) VGG encoder, a deep CNN encoder, any suitable encoder, or any number and combination thereof. The encoder 320 is configured to encode an image (e.g., a style image $x_{style}$) and generate a corresponding latent representation (e.g., a style latent representation $z_{style}$) based on an encoding of that image. The style transferer 330 is configured to perform an adaptive instance normalization process, any suitable neural style transfer process, or any number and combination thereof in response to receiving a set of inputs (e.g., first latent representation $z_{orig}$ and a style latent representation $z_{style}$). The style transferer 330 is configured to generate a stylized latent representation ($z_{adain}$) of the inputs to render content of one input (e.g., a first latent representation $z_{orig}$) in the style of another input (e.g., a style latent representation $z_{style}$). More specifically, for instance, the adaptive instance normalization process includes a neural style transfer algorithm that renders a content image in the style of another image. The adaptive instance normalization process includes a layer that aligns the mean and variance of the content features with those of the style features. The adaptive instance normalization process provides a fast, real-time arbitrary style transfer. The decoder 340 is a VGG decoder, a deep CNN decoder, any suitable decoder, or any number and combination thereof. The decoder 340 is configured to decode a latent representation (e.g., a stylized latent representation $z_{adajn}$) and generate a corresponding image (e.g., a style transferred image $x_{adain}$) based on a decoding of that latent representation. In addition, the mixer 350 is configured to receive a set of inputs and perform a mixing operation for the set of inputs by providing a weighting factor for each input. For example, the mixer 350 is configured to receive a set of inputs (e.g., $x_{orig}$ and $x_{adain}$) and mix (or combine) the set of inputs in a weighted manner. For example, the mixer 350 provides a combination of a first input (e.g., the content image "$x_{orig}$") at a first weight (e.g., mixing weight of m) and a second input (e.g., the style-transferred image "$x_{adain}$") at a second weight (e.g., 1−m). The first weight (e.g., m) may be drawn from a β (50,50) distribution. Most of the time, the first weight may be close to 0.5, but there is some stochasticity in the amount of style distortion. The mixer 350 outputs an augmented image. In this regard, to ensure that the training label (y) associated with the content image ($x_{orig}$) and/or the first image (x) is preserved, the augmented image ($x_{aug}$) is a mix of the content image ($x_{orig}$) and the style-transferred image ($x_{adin}$). The style augmenter 310 is configured to preserve the shape and content of the content image while distorting the style (e.g., colors, textures, etc.) of that same content image based on the style of the style image.

Referring back to FIG. 2, the training process 200 includes generating at least two augmented images ($x_{aug1}$ and $x_{aug2}$) from the same content image ($x_{orig}$) such that one or more model parameters of the machine learning system are updated based on a loss output that accounts for predictions by the machine learning system 140 with respect to the content image ($x_{orig}$), the first augmented image ($x_{aug1}$), and the second augmented image ($x_{aug2}$). In these examples, the first augmented image is different from the second augmented image, as expressed by $x_{aug1} \neq x_{aug2}$ in the above description of the algorithm at least since the first augmented image ($x_{aug1}$) is based on the first style of the first style image ($x_{style1}$) while the second augmented image ($x_{aug2}$) is based on the second style of the second style image ($x_{style2}$). The first style image ($x_{style1}$) is based on an image ($x_{rand1}$), which is randomly selected from a mini-batch. The second style image ($x_{style2}$) is based on another image ($x_{rand2}$), which is randomly selected from the mini-batch. In this example, the first style image is different than the second style image.

The style augmenter 310 is configured to generate the first augmented image ($x_{aug1}$) in response to receiving the content image ($x_{orig}$) and the first style image ($x_{style1}$) as input. More specifically, the encoder 320 is configured to encode the content image ($x_{orig}$) into a first latent representation ($z_{orig}$) upon receiving the content image ($x_{orig}$) as input. In addition, the encoder 320 is configured to encode the first style image ($x_{style1}$) into a second latent representation ($z_{style1}$). The style transferer 330 is configured to receive the first latent representation ($z_{orig}$) and the second latent representation ($z_{style1}$) as input from the encoder 320. The style transferer 330 is configured to perform a neural style transfer with respect to the first latent representation ($z_{orig}$) and the second latent representation ($z_{style1}$) in an embedding space to generate a first stylized latent representation ($z_{adain1}$) such that the content of the content image is maintained while a first style of the first style image is transferred and/or applied to the content. The decoder 340 receives the first stylized latent representation ($z_{adain1}$) as input from the style transferer 330. The decoder 340 is configured to decode the first stylized latent representation ($z_{adain1}$) into a first style transferred image ($x_{adain1}$). In response to receiving the content image ($x_{orig}$) and the first style transferred image ($x_{adain1}$), the mixer 350 is configured to mix or combine the content image ($x_{orig}$) at a first weight with the first style transferred image ($x_{adain1}$) at a second weight to generate the first augmented image ($x_{aug1}$). The first augmented image provides the content of the content image in a first style of the first style image.

In addition, the style augmenter 310 is configured to generate the second augmented image ($x_{aug2}$) in response to receiving the content image ($x_{orig}$) and the second style image ($x_{style2}$) as input data from the preprocessor 300. In this case, the style augmenter 310 uses the same content image ($x_{orig}$) when generating the first augmented image ($x_{aug1}$) and when generating the second augmented image ($x_{aug2}$). More specifically, the encoder 320 is configured to encode the content image ($x_{orig}$) into the first latent representation ($z_{orig}$). In addition, the encoder 320 is configured to encode the second style image ($x_{style2}$) into a third latent representation ($z_{style2}$). The style transferer 330 is configured to receive the first latent representation ($z_{orig}$) and the third latent representation ($z_{style2}$) as input from the encoder 320. The style transferer 330 is configured to perform a neural style transfer with respect to the first latent representation ($z_{orig}$) and the third latent representation ($z_{style2}$) in an embedding space to generate a second stylized latent representation ($z_{adain2}$) such that the content of the content image ($x_{orig}$) is maintained while a second style of the second style image ($x_{style2}$) is transferred and/or applied to the content. The decoder 340 receives the second stylized latent representation ($z_{adain2}$) from the style transferer 330 as input. The decoder 340 is configured to decode the second stylized latent representation ($z_{adain2}$) into a second style transferred image ($x_{adain2}$). In response to receiving the content image ($x_{orig}$) and the second style transferred image ($x_{adain2}$), the mixer 350 is configured to mix or combine the content image ($x_{orig}$) at a first weight with the second style transferred image ($x_{adain2}$) at a second weight to generate the second augmented image ($x_{aug2}$). The second augmented image provides the content of the content image in a second style of the second style image.

Referring back to FIG. 2, the style augmenting unit 220 is configured to perform data augmentation such that the machine learning system 140 (e.g., vision transformer) is trained with training data that includes at least the content image ($x_{orig}$), the first augmented image ($x_{aug1}$), and the second augmented image ($x_{aug2}$). In addition, the training process 200 includes computing a loss output that considers at least a predicted label of the content image, a predicted label of the first augmented image, and a predicted label of the second augmented image. The training process 200 further includes updating one or more model parameters of the machine learning system based on the loss output.

Figure 5:
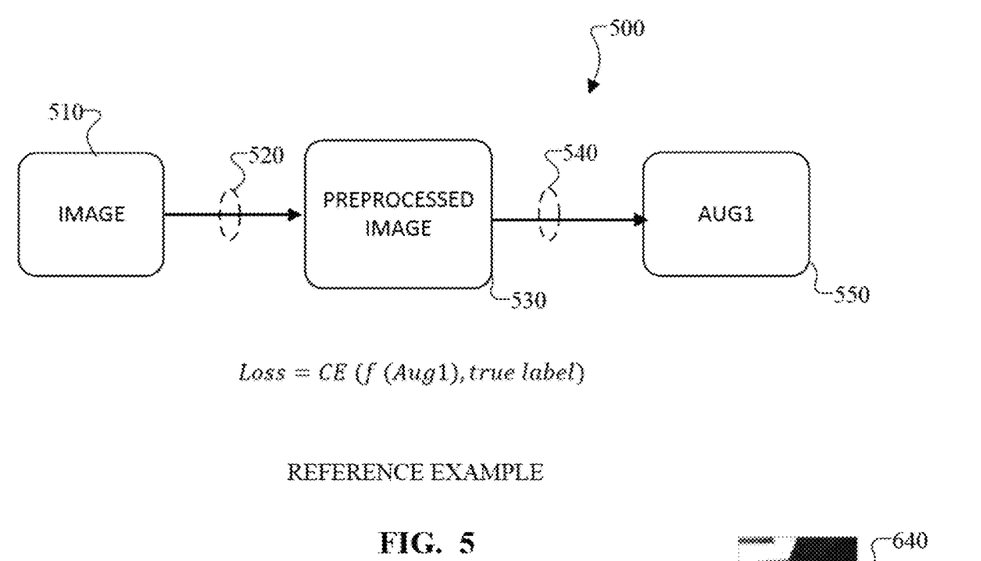
FIG. 5 is a diagram that illustrates a reference example of using cross-entropy loss with training data that includes an augmentation according to an example embodiment of this disclosure.

FIG. 5 is a conceptual diagram that illustrates a reference example that uses cross-entropy (CE) loss based on a classic augmentation setup 500. As shown in FIG. 5, this classic augmentation setup 500 includes performing preprocessing 520 on an image 510 to generate a preprocessed image 530. The classic augmentation setup includes augmenting 540 the preprocessed image 530 to generate a single augmented image 550 based on that single preprocessed image 530. As shown in FIG. 5, the classic augmentation setup 500 includes computing a cross-entropy classification loss. The cross-entropy classification loss determines loss based on (i) the predicted label provided by the machine learning system (e.g., denoted as f(Aug1)) and (ii) the true label. The cross-entropy (CE) classification loss is represented by equation 1.

$$\text{Loss}=CE(f(\text{Aug1}),\text{true label}) \qquad \text{[Equation 1]}$$

Figure 6:
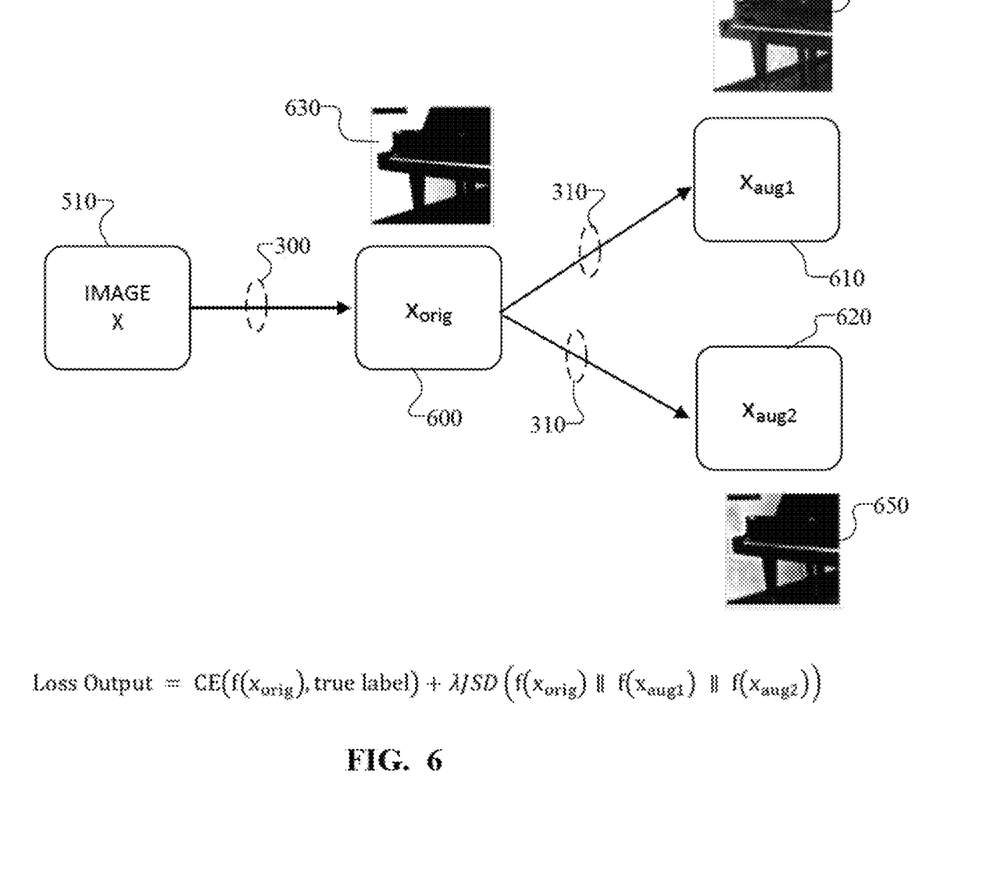
FIG. 6 is a diagram that illustrates an example of using a combination of cross-entropy loss and consistency loss with training data that includes neural style transfer augmentations according to an example embodiment of this disclosure.

FIG. 6 is a conceptual diagram that illustrates an example of using a combination of cross-entropy loss and consistency loss with training data that includes neural style transfer augmentations according to an example embodiment. More specifically, this example is based on the training process 200, as shown in FIG. 2. As previously discussed, the training process 200 includes a data augmentation process that involves generating at least a first augmented image 610 ($x_{aug1}$) and a second augmented image 620 ($x_{aug2}$) with respect to the same content image 600 ($x_{orig}$), whereby the shape and content is maintained among these different images while each of their styles (e.g., colors, textures, etc.) differ. To illustrate this concept, FIG. 6 includes non-limiting examples of the content image 600, the first augmented image 610, and the second augmented image 620. For instance, image 630 represents a non-limiting example of the content image 600, which shows a piano. Meanwhile, image 640 represents a non-limiting example of a first augmented image 610, which shows the same content of a piano in the context of a first style. Also, image 650 represents a non-limiting example of a second augmented image 620, which shows the same content of a piano in the context of a second style. In each of these cases, the true label is maintained as "piano," which may be taken from the training image 510 of the dataset 210.

As shown in FIG. 6, the training process 200 includes computing a loss output, which combines the CE loss with a consistency loss. The loss output is expressed in equation 2. In equation 2, the loss output is computed based on a sum of (i) a cross-entropy classification loss based on the content image and (ii) a Jensen-Shannon Divergence (JSD) consistency loss based on the content image, the first augmented image, and the second augmented image. Furthermore, in equation 2, "$\hat{y}$" represents the predicted label while "y" represents the true label. The same true label, "y," applies to the content image, the first augmented image, and the second augmented image, as the content is maintained in these images.

$$\text{Loss Output}=\mathcal{L}_{(f((\hat{y}|x_{orig})),y)}+\lambda \text{JSD}(f((\hat{y}|x_{orig}))\|f((\hat{y}|x_{aug1}))\|f((\hat{y}|x_{aug2}))) \qquad \text{[Equation 2]}$$

Furthermore, the JSD consistency loss is computed according to equation 3. In equation 3, KL represents the KL divergence, and $M=(\mathcal{P}_{orig}+\mathcal{P}_{aug1}+\mathcal{P}_{aug2})/3$. In this example, $\lambda=12$. In this regard, $\lambda$ is a constant, which may be any suitable value.

$$\text{JSD}(\mathcal{P}_{orig}\|\mathcal{P}_{aug1}\|\mathcal{P}_{aug2})=\tfrac{1}{3}(KL(\mathcal{P}_{orig}\|M)\|KL(\mathcal{P}_{aug1}\|M)\|KL((\mathcal{P}_{aug2}|M))) \qquad \text{[Equation 3]}$$

The JSD consistency loss imposes a large penalty when the posterior distribution predictions for the three versions ($x_{orig}$, $x_{aug1}$, $x_{aug2}$) of the image 510 (x) are very different. In this regard, the JSD consistency loss requires machine learning models to learn similar feature representations and output distributions across the different augmented versions of the same image. This explicitly trains machine learning models to become invariant to the augmentations used. By combining the style augmenter 310 (and/or the style augmenting unit 220) with the JSD consistency loss, the training process 200 is enabled to train at least one machine learning system 140, such as the vision transformer, to become invariant to the color, texture, and other distortions/transformations that were induced by the style augmenter 310.

The training process 200 is advantageous in enabling a trained machine learning system 140, such as the vision transformer, to perform a task, such as classification, based on content even if the content is presented in different styles. As aforementioned, after the training process 200, the trained machine learning system 140 may be employed by the system 100, another computer system, a control system, an actuator system, or any number and combination thereof. The trained machine learning system 140 may be applied in various image processing applications and/or computer vision applications (e.g., security systems, manufacturing systems, autonomous vehicles, medical imaging systems, etc.). In this regard, for example, when employed by the system 100 for an application relating to computer vision, the trained machine learning system is configured to output a class label for a certain object upon receiving an image of that certain object in one style and also output the same class label for that certain object upon receiving another image of that certain object in another style. More specifically, as a non-limiting example, after being trained by the training process 200 and when employed by the system 100, the trained machine learning system is configured to output a class label of house upon receiving an image of a house, which is shown in a summer style (e.g., warm colors, warn textures, etc.) and also output the same class label of house upon receiving another image of the house, which is shown in a winter style (e.g., cool colors, cool textures, etc.). As such, the trained machine learning system 140 is advantageous in various computer vision applications by being enabled to identify content for computer vision tasks even if that same content is presented in different styles.

As described in this disclosure, the embodiments provide a number of advantages and benefits. For example, the embodiments are advantageous in providing a training process 200 that improves CNNs and ViTs with respect to shape bias via the style augmenter 310 when implemented together with a loss output that includes a consistency loss. In addition, the combination of the style augmenter 310 (and/or style augmenting unit 220) and the consistency loss provides a training process 200, which improves ViT validation accuracy, robustness to corruptions, shape bias, and transfer learning performance. The embodiments have shown that using a consistency loss between different augmentations of the same image is especially helpful when training vision transformers.

In addition, the style augmenter 310 provides a novel data augmentation approach, which is inspired by shape bias in human visual perception. The style augmenter 310 performs neural style transfer in real-time from a randomly selected image to a given image during training. When combined with a consistency loss, the style augmenter 310 is configured to improve the vision transformer with respect to validation accuracy, robustness to corruptions, shape bias, and transferability to a different domain. Also, for training vison transformers, the style augmenter 310 (and/or the style augmenting unit 220) outperforms other state-of-the-art augmentations such as RandAugment and AugMix across several metrics (e.g., robustness, accuracy, transfer learning, shape bias, etc.). Furthermore, the training process 200 provides a training approach that improves the generalizability and robustness of vision transformers, which are good candidates for modeling human vision due to their robustness against adversarial attacks and distribution shifts.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, the illustrated embodiments relate to examples of machine learning systems that perform classification tasks. In addition, this disclosure is configured to be extended to machine learning systems that perform other tasks. As a non-limiting example, the machine learning task may include object detection, image segmentation, image modification, any computer vision task, or any number or combination thereof. Additionally or alternatively, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for training a machine learning system that includes a vision transformer, the computer-implemented method comprising:
   obtaining a content image;
   obtaining a first style image;
   obtaining a second style image;
   performing a first style transfer to transfer a first style from the first style image to the content image to generate a first stylized latent representation;
   performing a second style transfer to transfer a second style from the second style image to the content image to generate a second stylized latent representation;
   generating a first augmented image based on the first stylized latent representation;
   generating a second augmented image based on the second stylized latent representation;
   generating, via vision transformer, a predicted label for each of the content image, the first augmented image, and the second augmented image;
   computing a loss output for the vision transformer, the loss output including a consistency loss based at least on the predicted label of each of the content image, the first augmented image, and the second augmented image to train the vision transformer to become invariant to augmentations of the first augmented image and the second augmented image; and
   updating at least one parameter of the vision transformer based on the loss output.

2. The computer-implemented method of claim 1, wherein the loss output includes a sum of (a) a cross entropy loss based on the predicted label of the content image and (b) the consistency loss.

3. The computer-implemented method of claim 1, further comprising:
   encoding the content image to generate a first latent representation;
   encoding the first style image to generate a second latent representation;
   encoding the second style image to generate a third latent representation;
   performing the first style transfer between the first latent representation and the second latent representation to transfer the first style to the content image to generate the first stylized latent representation of the content image;
   performing the second style transfer between the first latent representation and the third latent representation to transfer the second style to the content image to generate the second stylized latent representation of the content image;
   decoding the first stylized latent representation to generate a first style transferred image that includes the content stylized in the first style; and
   decoding the second stylized latent representation to generate a second style transferred image that includes the content stylized in the second style.

4. The computer-implemented method of claim 3, wherein:
   the first style transfer includes adaptive instance normalization with respect to the first latent representation and the second latent representation; and
   the second style transfer includes the adaptive instance normalization with respect to the first latent representation and the third latent representation.

5. The computer-implemented method of claim 3, further comprising:
   combining the content image at a first weight and the first style transferred image at a second weight to generate the first augmented image; and
   combining the content image at the first weight and the second style transferred image at the second weight to generate the second augmented image.

6. The computer-implemented method of claim 1, further comprising:
   generating the content image by performing a first random cropping operation and a first modification on a first image;
   generating the first style image by performing a second random cropping operation and a second modification on a second image; and
   generating the second style image by performing a third random cropping operation and a third modification on a third image.

7. The computer-implemented method of claim 1, wherein the consistency loss is computed using at least a first distribution involving the content image, a second distribution involving the first augmented image, and a third distribution involving the second augmented image.

8. The computer-implemented method of claim 1, wherein a same true label applies to the content image, the first augmented image, and the second augmented image when computing the loss output.

9. A computer-implemented method for training a vision transformer, the method comprising:
   obtaining a content image;
   obtaining a first style image;
   obtaining a second style image;
   generating a first augmented image based on content of the content image and a first style of the first style image;
   generating a second augmented image based on the content of the content image and a second style of the second style image;
   generating, via the vision transformer, a predicted label for each of the content image, the first augmented image, and the second augmented image;
   computing a loss output for the vision transformer, the loss output including a consistency loss based at least on the predicted label of each of the content image, the first augmented image, and the second augmented image such that the vision transformer is trained to become invariant to augmentations of the first augmented image and the second augmented image; and
   updating at least one parameter of the vision transformer based on the loss output.

10. The computer-implemented method of claim 9, wherein the loss output includes a sum of (a) a cross entropy loss based on the predicted label of the content image and (b) the consistency loss.

11. The computer-implemented method of claim 9, further comprising:
   encoding the content image into a first latent representation;
   encoding the first style image into a second latent representation;
   encoding the second style image into a third latent representation;
   performing a first style transfer between the first latent representation and the second latent representation to transfer the first style to the content image to generate a first stylized latent representation of the content image;
   performing a second style transfer between the first latent representation and the second latent representation to transfer the second style to the content image to generate a second stylized latent representation of the content image;
   decoding the first stylized latent representation to generate a first style transferred image; and
   decoding the second stylized latent representation to generate a second style transferred image.

12. The computer-implemented method of claim 11, further comprising:
   combining the content image at a first weight and the first style transferred image at a second weight to generate the first augmented image; and
   combining the content image at the first weight and the second style transferred image at the second weight to generate the second augmented image.

13. The computer-implemented method of claim 11, wherein;
   the first style transfer includes an adaptive instance normalization with respect to the first latent representation and the second latent representation; and
   the second style transfer includes the adaptive instance normalization with respect to the first latent representation and the third latent representation.

14. The computer-implemented method of claim 9, further comprising:
   generating the content image by performing a first random cropping operation and a first modification on a first image;
   generating the first style image by performing a second random cropping operation and a second modification on a second image; and
   generating the second style image by performing a third random cropping operation and a third modification on a third image.

15. The computer-implemented method of claim 14, wherein:
   the second image is randomly selected from a batch of images; and
   the third image is randomly selected from the batch of images.

16. One or more non-transitory computer readable storage media having computer readable data including instructions stored thereon that when executed by one or more processors perform a method that comprises:
   generating a content image;
   generating a first style image;
   generating a second style image;
   generating, via a first machine learning system, a first augmented image based at least on content of the content image and a first style of the first style image;
   generating, via the first machine learning system, a second augmented image based at least on the content of the content image and a second style of the second style image;
   training a second machine learning system with training data that includes the content image, the first augmented image, and the second augmented image;
   computing a loss output for the second machine learning system, the loss output including a consistency loss based at least on the content image, the first augmented image, and the second augmented image to train the second machine learning system to become invariant to augmentations of the first augmented image and the second augmented image; and
   updating at least one parameter of the second machine learning system based on the loss output,
   wherein the second machine learning system is a vision transformer.

17. The one or more non-transitory computer readable storage media of claim 16, wherein the loss output includes a sum of (a) a cross entropy loss based on the predicted label of the content image and (b) the consistency loss.

18. The one or more non-transitory computer readable storage media of claim 14, wherein the first machine learning system is operable to:
   encode the content image into a first latent representation;
   encode the first style image into a second latent representation;
   encode the second style image into a third latent representation;
   perform a first style transfer between the first latent representation and the second latent representation to transfer the first style to the content image to generate a first stylized latent representation;

perform a second style transfer between the first latent representation and the second latent representation to transfer the second style to the content image to generate a second stylized latent representation;

decode the first stylized latent representation to generate a first style transferred image; and decode the second stylized latent representation to generate a second style transferred image.

19. The one or more non-transitory computer readable storage media of claim 18, wherein the method further comprises:

combining the content image at a first weight and the first style transferred image at a second weight to generate the first augmented image; and combining the content image at the first weight and the second style transferred image at the second weight to generate the second augmented image.

20. The one or more non-transitory computer readable storage media of claim 14, wherein the method further comprises:

generating the content image by performing a first random cropping operation and a first modification on a first image;

generating the first style image by performing a second random cropping operation and a second modification on a second image; and generating the second style image by performing a third random cropping operation and a third modification on a third image.

* * * * *

UNITED STATES PATENT AND TRADEMARK OFFICE
CERTIFICATE OF CORRECTION

| | | |
|---|---|---|
| PATENT NO. | : 12,327,331 B2 | Page 1 of 1 |
| APPLICATION NO. | : 17/540326 | |
| DATED | : June 10, 2025 | |
| INVENTOR(S) | : Umakantha et al. | |

It is certified that error appears in the above-identified patent and that said Letters Patent is hereby corrected as shown below:

In the Claims

In Claim 18, at Column 14, Line 59: "of claim 14," should read --of claim 16,--.

In Claim 20, at Column 15, Line 21: "of claim 14," should read --of claim 16,--.

Signed and Sealed this
Second Day of December, 2025

John A. Squires
*Director of the United States Patent and Trademark Office*